US012571594B2

(12) United States Patent
Gemer et al.

(10) Patent No.: US 12,571,594 B2
(45) Date of Patent: Mar. 10, 2026

(54) EXTENDABLE CONDUCTOR FOR THERMAL MANAGEMENT

(71) Applicant: Lunar Outpost Inc., Golden, CO (US)

(72) Inventors: Andrew Josef Gemer, Lafayette, CO (US); Colby Moxham, Golden, CO (US); Van Wagner, Lakewood, CO (US); Peter Wilson, Lakewood, CO (US)

(73) Assignee: Lunar Outpost Inc., Arvada, CO (US)

( * ) Notice: Subject to any disclaimer, the term of this patent is extended or adjusted under 35 U.S.C. 154(b) by 18 days.

(21) Appl. No.: 18/047,927

(22) Filed: Oct. 19, 2022

(65) Prior Publication Data

US 2023/0121022 A1     Apr. 20, 2023

Related U.S. Application Data

(60) Provisional application No. 63/257,221, filed on Oct. 19, 2021.

(51) Int. Cl.
| | |
|---|---|
| *F28C 3/00* | (2006.01) |
| *B62D 63/04* | (2006.01) |
| *B64G 1/16* | (2006.01) |
| *E21B 7/02* | (2006.01) |
| *F24T 50/00* | (2018.01) |

(52) U.S. Cl.
CPC .............. *F28C 3/005* (2013.01); *B62D 63/04* (2013.01); *B64G 1/16* (2013.01); *F24T 50/00* (2018.05); *E21B 7/027* (2013.01)

(58) Field of Classification Search
None
See application file for complete search history.

(56) References Cited

U.S. PATENT DOCUMENTS

| | | | | |
|---|---|---|---|---|
| 4,212,346 A | * | 7/1980 | Boyd ................... | G05D 23/192 |
| | | | | 165/277 |
| 2008/0049398 A1 | * | 2/2008 | Griffiths ................. | F28F 13/00 |
| | | | | 361/704 |
| 2008/0215185 A1 | * | 9/2008 | Jacobsen ................ | F41H 11/16 |
| | | | | 901/14 |

(Continued)

FOREIGN PATENT DOCUMENTS

| | | | | | |
|---|---|---|---|---|---|
| CA | 3006654 A1 | * | 1/2019 | ........... | E21B 36/001 |
| CN | 106965954 A | * | 7/2017 | ............. | B62D 57/02 |

(Continued)

OTHER PUBLICATIONS

JP H07156897 A English Machine Translation (Year: 1995).*
Supplemental English Machine Translation JP H-07156897 A1 (Year: 1995).*

*Primary Examiner* — Jenna M Maroney

(57) ABSTRACT

A conductor of the extendable conductor assembly may be extended (e.g., into a thermal target, such as a preexisting or a newly created feature of a planetary body) and used to thermally couple a rover, vehicle, fixed installation, or other hardware with the thermal target. Thus, the temperature of the hardware may be managed via heat transfer to/from the thermal target. For instance, heat may be transferred from the thermal target to maintain the temperature of the hardware under cold conditions, while excess heat may be transferred to the thermal target under hot conditions. A rover forms a borehole in the lunar surface, in which a conductor is extended to facilitate heat transfer between the rover and the Moon accordingly.

20 Claims, 7 Drawing Sheets

(56)     References Cited

U.S. PATENT DOCUMENTS

| | | | | |
|---|---|---|---|---|
| 2008/0314560 A1* | 12/2008 | Grayson | ................. | F28F 13/00 |
| | | | | 165/96 |
| 2013/0014928 A1* | 1/2013 | Grayson | ................. | F28F 13/00 |
| | | | | 165/86 |
| 2014/0363718 A1* | 12/2014 | Andres | .............. | H01M 10/613 |
| | | | | 165/277 |
| 2018/0299391 A1* | 10/2018 | Sanda | .................... | G01N 25/18 |
| 2019/0017350 A1* | 1/2019 | Kusmer | ............. | E21B 47/0175 |
| 2021/0116889 A1* | 4/2021 | Keravala | ................... | B25J 5/00 |
| 2022/0403740 A1* | 12/2022 | Kotenberg | ............. | E21B 41/00 |
| 2023/0121022 A1* | 4/2023 | Gemer | .................. | B62D 63/04 |
| | | | | 280/727 |
| 2023/0129911 A1* | 4/2023 | Gemer | .................... | H02K 1/32 |
| | | | | 310/61 |

FOREIGN PATENT DOCUMENTS

| | | | | | | |
|---|---|---|---|---|---|---|
| CN | 109237840 | A | * | 1/2019 | .............. | E02D 5/22 |
| CN | 110002006 | A | * | 7/2019 | .......... | B62D 55/065 |
| CN | 110450984 | A | * | 11/2019 | | |
| CN | 111485884 | B | * | 5/2021 | ............ | E21B 15/00 |
| CN | 115012404 | A | * | 9/2022 | | |
| CN | 115015007 | A | * | 9/2022 | | |
| DE | 102021001813 | B4 | * | 3/2023 | .............. | B64G 1/16 |
| EP | 3940313 | A1 | * | 1/2022 | ............. | F24T 10/15 |
| JP | H07156897 | A | * | 6/1995 | | |
| JP | 2001106194 | A | * | 4/2001 | | |
| JP | 2017040469 | A | * | 2/2017 | | |
| RU | 180696 | U1 | * | 6/2018 | | |
| RU | 2770475 | C1 | * | 4/2022 | | |
| WO | WO-2019216336 | A1 | * | 11/2019 | ............. | B64G 1/105 |

* cited by examiner

250

254A

254B

252

200

EXTENDABLE CONDUCTOR ASSEMBLY

CONDUCTOR

EXTENSION/ RETRACTION MECHANISM

THERMAL SENSOR(S)

FORCE SENSOR(S)

CONTROLLER

202

204

206

208

210

EXTENDABLE CONDUCTOR FOR THERMAL MANAGEMENT

CROSS-REFERENCE TO RELATED APPLICATION

This application claims priority to U.S. Provisional Application No. 63/257,221, titled "An Extendable Subsurface Geothermal Heat Collector to Provide Thermal Conduction for Robotic and Electronic Survival in Extreme Environments (DrillHeat)," filed on Oct. 19, 2021, the entire disclosure of which is hereby incorporated by reference in its entirety.

BACKGROUND

Vehicles, electronic devices, and other hardware have a range of operating temperatures, outside of which, unexpected or unintended operation, or even failure, may result. For example, a mechanical component may seize and/or an electronic component may no longer function above a maximum temperature or below a minimum temperature. In some examples, damage may result outside of such operating temperature ranges. For instance, the lunar surface exhibits a wide range of temperatures, and the extreme cold of the lunar night often causes mechanical and electrical components of landers, rovers, and other hardware to fail.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure relate to an extendable conductor assembly. A conductor of the extendable conductor assembly may be extended (e.g., into a thermal target, such as a preexisting or a newly created feature of a planetary body) and used to thermally couple a rover, vehicle, fixed installation, or other hardware with the thermal target. Thus, the temperature of the hardware may be managed via heat transfer to/from the thermal target. For instance, heat may be transferred from the thermal target to maintain the temperature of the hardware under cold conditions, while excess heat may be transferred to the thermal target under hot conditions. As an example, a rover may form a borehole in the lunar surface, in which a conductor may be extended to facilitate heat transfer between the rover and the Moon accordingly.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1A:
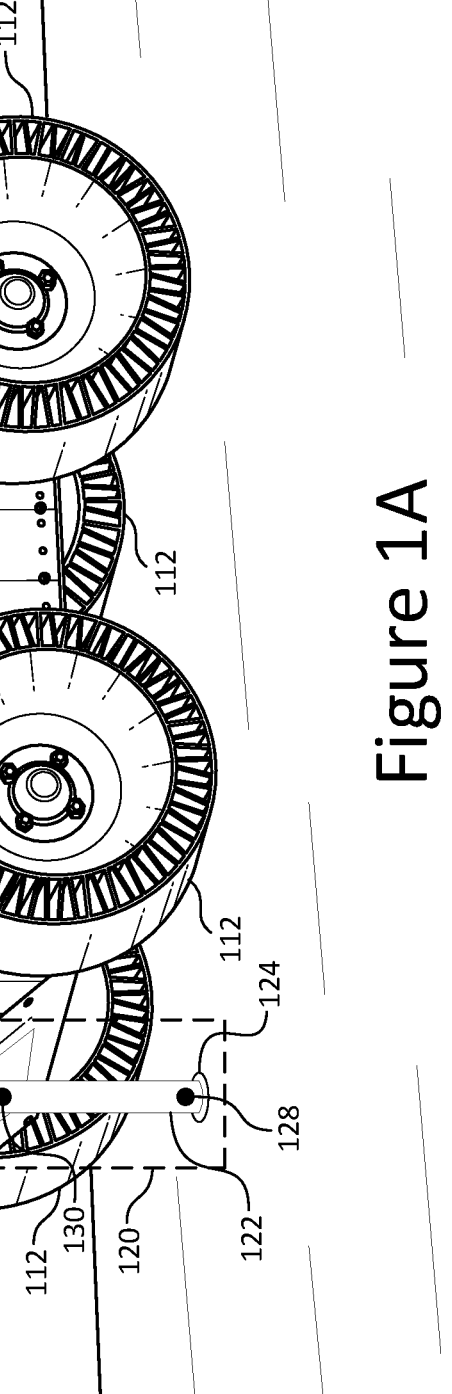
FIG. 1A illustrates an example vehicle with which an extendable conductor for thermal management may be used according to aspects described herein.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Some electrical and mechanical hardware operate in environments having a high degree of temperature variability. This is especially true for hardware operating on the Moon or on Mars, among other examples. For instance, a lander or rover on the Moon may be at least partially exposed to deep space, such that, in the absence of light from the sun, heat is radiated into deep space, thereby resulting in extremely low temperatures. Similarly, a high degree of solar radiation may be received during the lunar day, which may result in very high temperatures. Thus, it is difficult to regulate the temperature of hardware in these environments to avoid exceeding a range of operating temperatures for the hardware.

Accordingly, aspects of the present application relate to an extendable conductor for thermal management. In examples, an extendable conductor is used to transfer heat between electrical and/or mechanical hardware (e.g., a robot, vehicle, fixed installation, or rover) and a planetary body or other thermal target. For example, the planetary body may exhibit greater thermal stability beneath the surface, thereby acting as a reservoir of heat. The extendable conductor may be extended toward or into the thermal target and may thus permit heat to flow from the planetary body to the hardware under cold conditions or, similarly, may permit excess heat to flow from the hardware to the planetary body to remove it from the hardware system under hot conditions. In examples, excess heat may be stored using the planetary body, thereby enabling subsequent retrieval via the extendable conductor under comparatively cooler conditions. Thus, the disclosed aspects may enable thermal regulation in both hot and cold conditions, which may improve the longevity and/or operability of hardware in a variety of potentially extreme operating environments.

Example conductors include, but are not limited to, a conducting wire or rod (e.g., including a material that is thermally conductive, such as graphite, copper, or aluminum), a heat pipe or other heat-transfer device (e.g., that includes an active process, such as phase transition, to improve thermal conductivity), or a drill bit or other tool. For example, a drill bit may be used as a conductor in examples where it would already be included as part of a planned mission or for other design considerations, thereby reducing the extent to which additional hardware (and thus weight, complexity, and/or expense) is included for the purpose of thermal management. In examples, an inner portion of the drill bit may have relatively greater thermal conductivity (e.g., copper, aluminum, or a heat pipe), while an outer portion may have relatively greater strength (e.g., steel or tungsten carbide).

As noted above, a conductor may include any of a variety of materials. In examples, a conductor may include fins or fluting (e.g., in the case of a drill bit) so as to increase the surface area via which heat may be transferred. As another example, the conductor may have a surface preparation that is conducive to heat transfer (e.g., a rougher surface, as compared to a polished surface thus having less surface area). Additionally, or alternatively, one or more surface coatings may be used to alter the emissivity/absorptivity of the conductor. For example, a black coating may be used to increase absorptivity, while a white coating may be used to decrease absorptivity. As another example, polished silver or gold may be used to decrease emissivity. As another example, different tapes of films may be used to alter emissivity. In some instances, a surface may be anodized to create a rougher surface and the color of the anodize may be used to fine tune the surface properties accordingly. Thus, it will be appreciated that a conductor may have any of a variety of attributes to affect its thermal characteristics.

Similarly, attributes of a conductor need not be homogenous for the length of the conductor. For instance, a conductor may be designed such that thermal conductivity (e.g., thermal conductivity, emissivity, and/or absorptivity) increases or decreases along the length (and/or other dimension) of the conductor. Conductivity need not increase or decrease linearly. As another example, a conductor may be designed such that different regions have different associated conductivities.

In examples, a rover on the lunar surface, Martian surface, or other planetary body may include an extendable conductor assembly according to aspects described herein to prevent the rover from freezing overnight (e.g., in the absence of heat from the Sun). Examples of the present disclosure provide for drilling into the lunar surface and then, by leaving the drill bit extended below the lunar surface, heat from below the surface will be transferred through the drill bit to the rover. Heat transferred via such an extendable conductor is helpful in reducing the likelihood that the rover will experience temperatures that are below the minimum operating temperature for the rover. The next day, the rover can either detach from the drill bit or can retract the drill bit and thus continue to move about the lunar surface.

While examples are described with respect to a planetary body, it will be appreciated that any of a variety of additional or alternative thermal targets may be used, including, but not limited to, geographic features (e.g., sand, soil, regolith, rocks/boulders, ice sheets, cracks, crevasses, puddles, streams, or rivers) or man-made features (e.g., boreholes or exhaust vents), among other examples. In some instances, a thermal target may be preexisting (e.g., a borehole left by a previous rover or a hole formed by an animal or natural process) or may be adapted for use with an extendable conductor according to aspects described herein. For example, a borehole may be formed in a thermal target using a drill (which may itself be a conductor as noted above).

In some instances, a stabilizing compound may be used to stabilize a wall (e.g., of a borehole, crack, or crevasse) or other feature of the thermal target. The stabilizing compound may be introduced separately (e.g., via a pipe and/or nozzle) or may be introduced via the conductor itself (e.g., a drill bit may further include a channel through which the stabilizing compound may flow), among other examples. Example stabilizing compounds include, but are not limited to, a thermal grease, a thermal epoxy, or a standard grease (e.g., having a lower thermal conductivity). As an example, the stabilizing compound may be introduced before or after forming a borehole. In some examples, the stabilizing compound may alternatively or additionally change one or more thermal characteristics of the thermal target and/or the extendable conductor (e.g., to increase or decrease the emissivity and/or absorptivity of the target/conductor).

A conductor may be extended/retracted into the ground or other thermal target according to aspects described herein using any of a variety of mechanisms, including, but not limited to, a linear actuator or a spool or reel (e.g., on which a conducting wire or other conductor may be stored). As another example, a telescoping conductor may be used. In examples, the degree to which a conductor is extended may be controlled so as to achieve a desired amount of heat transfer, for example such that the conductor may be extended further into a borehole to increase heat transfer or may be retracted from the borehole to decrease heat transfer.

As another example, a conductor may be fully extended into a thermal target in instances where there is excess heat (e.g., during daytime or when one or more systems are generating excess heat), thereby storing the excess heat in the thermal target. Then, in instances where heat is to be transferred from the thermal target (e.g., during the night or as may be otherwise needed to warm one or more systems), the extendable conductor may gradually be extended into the thermal target (thus accessing heat from progressively deeper regions). It will be appreciated that any of a variety of additional or alternative control schemes may be used, examples of which are discussed below in greater detail.

Figure 1B:
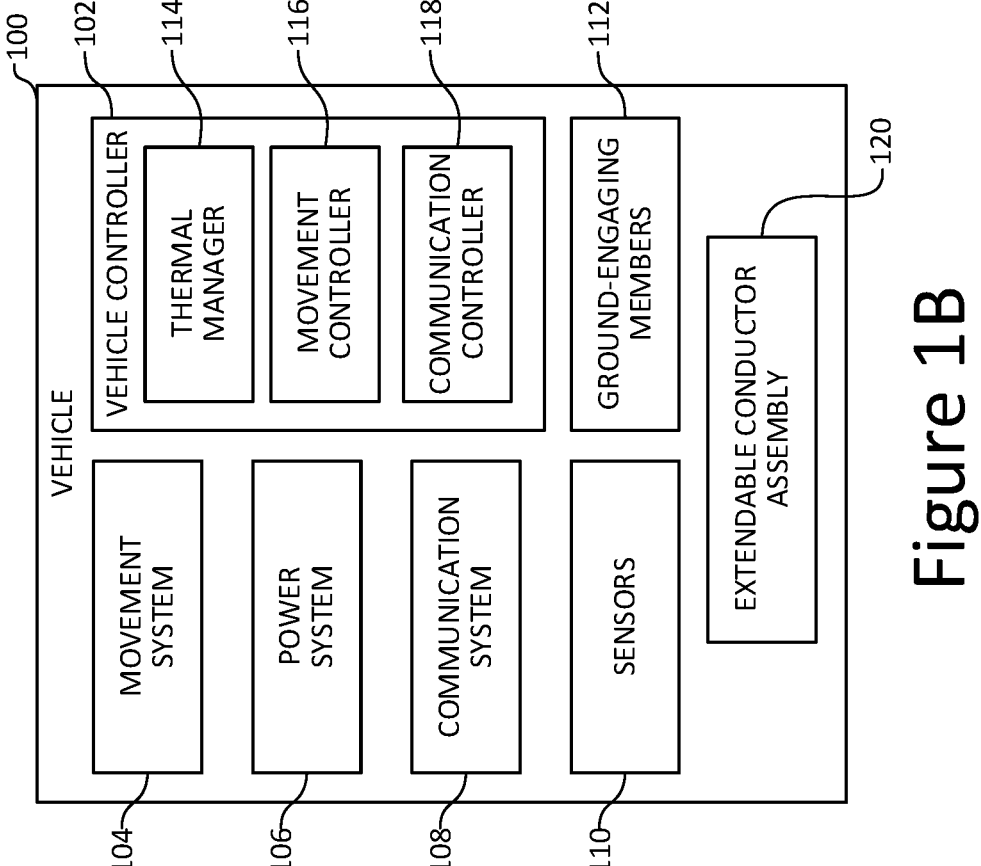
FIG. 1B illustrates a conceptual diagram of the example vehicle in FIG. 1A.

FIGS. 1A and 1B illustrate aspects of an example vehicle 100 with which an extendable conductor 122 for thermal management may be used according to aspects described herein. As noted above, extendable conductor 122 may similarly be used with any of a variety of other types of hardware in other examples. With reference to FIG. 1A, vehicle 100 is illustrated on lunar surface 126. Extendable conductor 122 of extendable conductor assembly 120 is extended into borehole 124 of lunar surface 126. As illustrated, extendable conductor 122 is extended substantially perpendicular to lunar surface 126, though it will be appreciated that any of a variety of other angles may be used in other examples. Borehole 124 may have been formed by extendable conductor 122 or, as another example, borehole 124 may have been preexisting. With reference now also to FIG. 1B, vehicle 100 includes vehicle controller 102, movement system 104, power system 106, communication system 108, sensors 110, ground-engaging members 112, and extendable conductor assembly 120.

It will be appreciated that vehicle 100 may be any of a variety of vehicles, including, but not limited to, a rover or a robot. Vehicle 100 is illustrated as further including one or more ground-engaging members 112. Example ground-engaging members include, but are not limited to, wheels or tracks. In examples, vehicle 100 may be remotely controlled (e.g., via communication system 108) and/or may be autonomously controlled (e.g., as may be affected by vehicle controller 102).

Movement system 104 may include a prime mover (e.g., an electric motor or an internal combustion engine) to power ground-engaging members 112, as well as a steering system, which may control a steering angle of one or more ground-engaging members 112 and/or may cause ground-engaging members 112 to be powered differently to achieve rotation about an axis. In examples, movement controller 116 of vehicle controller 102 controls movement system 104 to affect movement of vehicle 100 accordingly. For example, movement controller 116 may cause movement system 104 to propel vehicle 100 forward, backward, or in any of a variety of other directions. Movement controller 116 may control movement system 104 according to one or more commands that are received by vehicle 100 (e.g., via communication system 108) from a remote device (not pictured) and/or may control movement system 104 at least partially automatically (e.g., based on data from sensors 110).

Power system 106 may provide electrical power to movement system 104, communication system 108, and/or vehicle controller 102, among other examples. In examples, power system 106 includes a battery and a solar panel with which to recharge the battery. As another example, power system 106 may include a radioisotope thermoelectric generator. Thus, it will be appreciated that vehicle 100 may include any of a variety of power sources and, similarly, any of a variety of movement systems may be used to propel vehicle 100 accordingly.

Communication system 108 may include any of a variety of communication technologies to provide wired and/or wireless communication for vehicle 100. Communication controller 118 of vehicle controller 102 may control communication system 108, thereby enabling communication to and/or from vehicle 100. For example, communication controller 118 may configure one or more radios of communication system 108 and/or may establish a connection with one or more remote devices (not pictured).

Sensors 110 of vehicle 100 may include any of a variety of sensors, including, but not limited to, image capture devices (e.g., visible light and/or infrared cameras), light sensors, proximity sensors, temperature sensors (e.g., thermocouples or thermistors), three-dimensional mapping sensors (e.g., using multiple image capture devices or a light detection and ranging (LIDAR) system), and/or chemical composition sensors, among other examples. In examples, sensors 110 include a variety of temperature sensors associated with various components of vehicle 100, such that thermal manager 114 may manage the temperature of vehicle 100 and constituent components thereof using extendable conductor assembly 120. For instance, conductor 122 of extendable conductor assembly 120 is configured to facilitate radiative, conductive, and/or convective heat transfer to one or more components of vehicle 100, such that conductor 122 is termed to be "thermally coupled" with the components of vehicle 100. It will be appreciated that "thermal coupling" need not require "mechanical coupling," as may be the case when radiative heat transfer occurs. Thus, a conductor that is thermally coupled to a planetary body need not be mechanically coupled or otherwise in physical contact with the planetary body. In examples, conductor 122 may be switchably coupled to such components, thereby enabling thermal manager 114 to selectably transfer heat between conductor 122 and any of a variety of components of vehicle 100.

Vehicle controller 102 is illustrated as further comprising thermal manager 114. In examples, thermal manager 114 evaluates an environment in which vehicle 100 is operating to identify a thermal target (e.g., from or to which heat may be transferred). The environment may be evaluated using one or more thermal sensors, IR cameras, and/or LIDAR, among other sensors, to identify the thermal target. In other examples, an indication of a thermal target may be received from a remote device (e.g., via communication system 108). Accordingly, thermal manager 114 may provide an indication to movement controller 116 to maneuver to the thermal target accordingly. In other examples, vehicle 100 may already be positioned such that extendable conductor assembly 120 is already proximate to a thermal target (e.g., such that conductor 122 may be extended toward, and thus be thermally coupled with, the thermal target). As illustrated, conductor 122 is thermally coupled with lunar surface 126 at borehole 124.

In an example, thermal manager 114 determines to prepare the thermal target, as may be the case when there is not a preexisting borehole or other feature in which conductor 126 can be extended. For instance, thermal manager 114 makes such a determination based on a model of the structure, thermal characteristics of the thermal target, and/or based on an indication received from a remote device. Thermal manager 114 may provide an indication to activate and extend a drill (e.g., as may be part of extendable conductor assembly 120), thereby forming a borehole in the thermal target. As another example, thermal manager 114 provides an indication (e.g., to extendable conductor assembly 120) to introduce a stabilizing compound, thereby causing the deposition of the thermal compound to alter the mechanical and/or thermal properties of the thermal target. It will thus be appreciated that any of a variety of operations may be performed to prepare a thermal target. In other examples, thermal manager 114 determines that a thermal target is usable substantially as-is, as may be the case when a preexisting borehole or natural feature of the environment is used in conjunction with extendable conductor assembly 120 according to aspects described herein.

Thermal manager 114 may provide an indication to extendable conductor assembly 120 to extend conductor 122. In examples, thermal manager 114 may control a linear actuator or a spool/reel of extendable conductor assembly 120, among other examples. In some instances, extendable conductor assembly 120 includes one or more force/torque sensors, which may be monitored by thermal manager 114 to identify an instance where conductor 122 has contacted the thermal target. In instances where a preexisting borehole or natural feature is being used, contacting the thermal target with conductor 122 may introduce an unnecessary or otherwise undesirable element of risk. In such an instance, thermal manager 114 stops extending conductor 122 or, as another example, at least partially retracts conductor 122 to avoid or mitigate potential damage to conductor 122, extendable conductor assembly 120, and/or vehicle 100 that may result from contact with the thermal target. Additional examples of such aspects are discussed below with respect to method 400 of FIG. 4.

Conductor 122 may include one or more thermal sensors, such that heat transfer may be monitored by thermal manager 114. For example, conductor 122 includes outermost thermal sensor 128 (e.g., closest to the end of the conductor and, thus, the thermal target) and innermost thermal sensor 130 (e.g., closest to vehicle 100). Additionally, or alternatively, to innermost thermal sensor 130, a thermal sensor of vehicle 100 may be located at or near where extendable conductor assembly 120 is thermally coupled to vehicle 100. While example sensors are described, it will be appreciated that additional, alternative, or fewer sensors may be used in other examples. For instance, an IR camera may be used in place of or in addition to thermal sensors in other examples.

By monitoring thermal data associated with extendable conductor assembly 120, thermal manager 114 may determine a rate of transfer for heat between extendable conductor assembly 120 and the thermal target. In examples, thermal manager 114 may determine to further extend conductor 122 to increase heat transfer, as may be the case when an operating temperature threshold has been breached or a rate of change is below a predetermined threshold. As another example, thermal manager 114 may determine to retract conductor 122 to reduce heat transfer, as may be the case when a temperature sensor indicates that a component has returned to an operating temperature range or when a rate of change is above a predetermined threshold. While example control schemes are described, it will be appreciated that any of a variety of additional thresholds, thermal data, and/or associated processing may be used in other examples.

In examples, thermal manager 114 may collect telemetry data associated with extendable conductor assembly 120, which may be stored by vehicle controller 102 and/or transmitted to a remote device (e.g., via communication system 108). Example telemetry data includes, but is not limited to, characteristics of a thermal target (e.g., geometry of the target, an estimated or measured density and/or hardness, and/or one or more thermal characteristics), a measured rate of heat transfer with the thermal target in relation to a degree to which conductor 122 was extended, and/or an effect on one or more systems of vehicle 100, among other examples. Thus, telemetry data from thermal manager 114 may be used to improve subsequent thermal modeling that is performed by thermal manager 114 and/or may inform engineering decisions for subsequent design iterations (e.g., material choices, coating choices, and/or conductor geometry choices), among other examples.

Figure 2B:
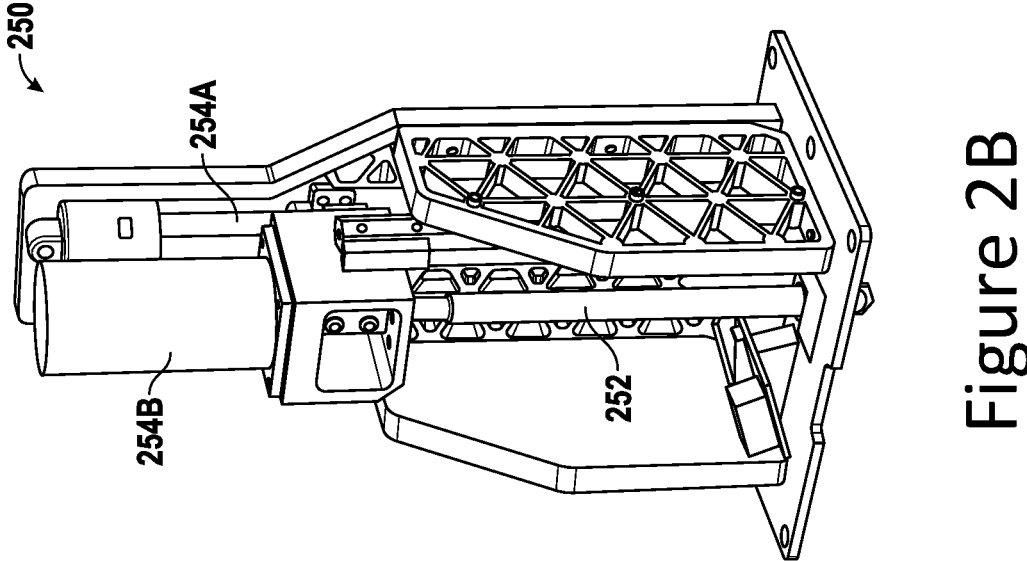
FIGS. 2A, 2B, and 2C illustrate example extendable conductor assemblies.
Figure 2A:
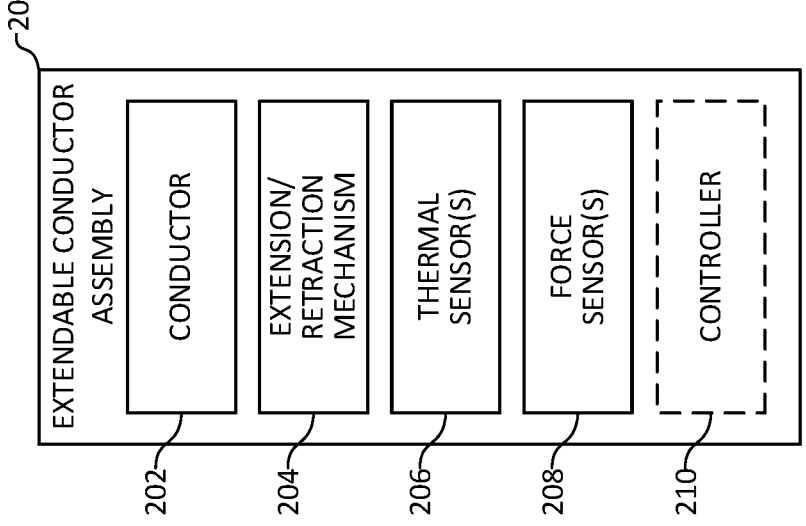
Figure 2C:
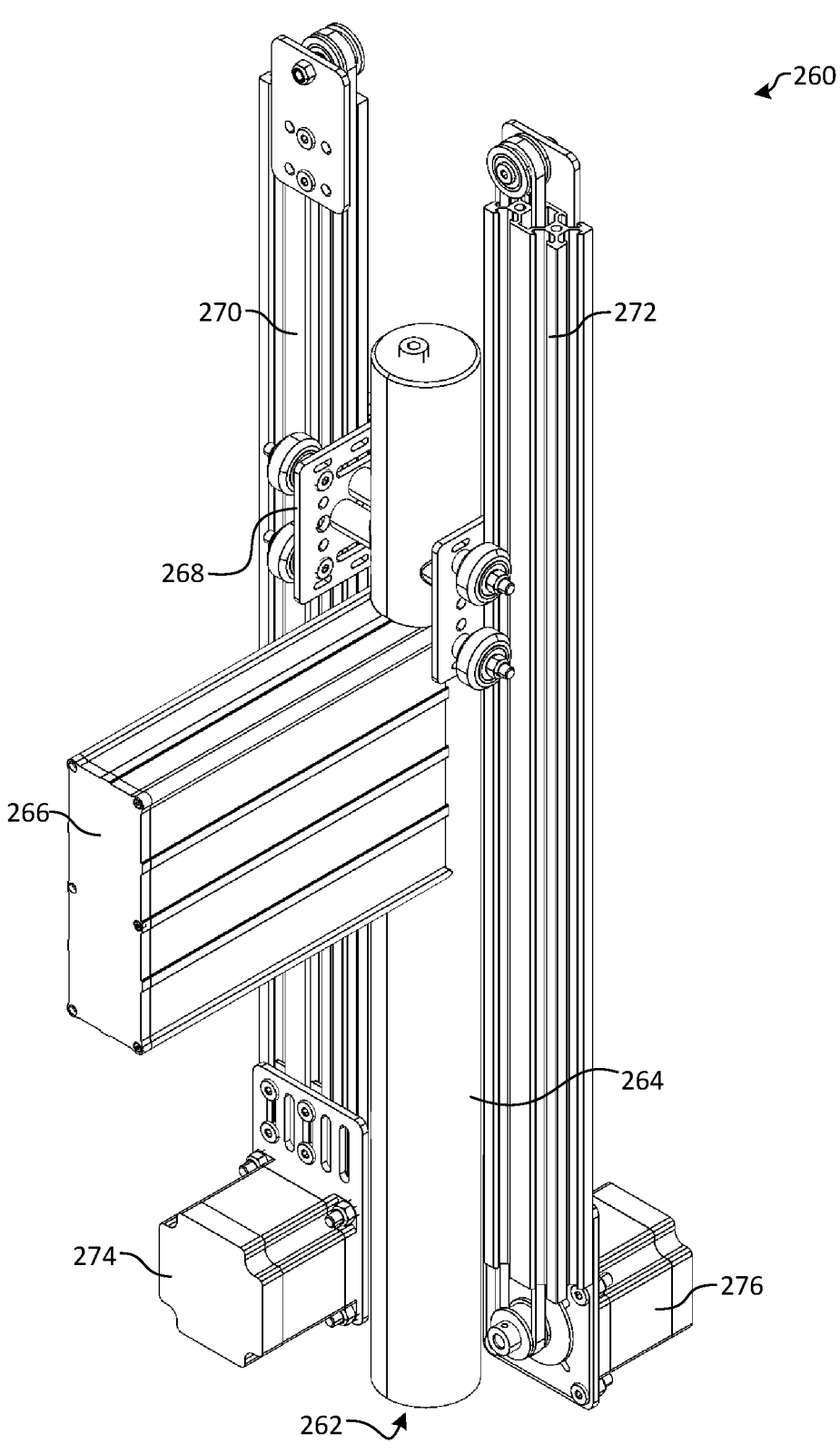

Vehicle 100 is further illustrated as comprising extendable conductor assembly 120, aspects of which may be similar to those described in more detail with respect to extendable conductor assemblies 200, 250, and 260 in FIGS. 2A, 2B, and 2C, respectively. It will be appreciated that vehicle 100 is provided as an example of a vehicle with which extendable conductor assembly 120 may be used according to aspects described herein. Any of a variety of other vehicles or other hardware may be used in other examples.

With reference to FIG. 2A, extendable conductor assembly 200 is illustrated as comprising conductor 202, extension/retraction mechanism 204, thermal sensor(s) 206, force sensor(s) 208, and controller 210. Aspects of conductor 202 and controller 210 may be similar to those discussed above with respect to conductor 122 and thermal manager 114, respectively, and are therefore not necessarily redescribed below in detail. Controller 210 is illustrated using a dashed box to indicate that, in other examples, aspects performed by controller 210 may be performed at least in part by a different controller (e.g., vehicle controller 102 in FIG. 1B).

As noted above, conductor 202 may include a conducting wire or rode, a heat pipe or other heat-transfer device, or a drill bit or other tool, among other examples. Depending on the environment in which conductor 202 is used, most heat transfer may occur via radiation (rather than conduction). Thus, conductor 202 need not be sized and/or shaped to contact or otherwise match a borehole or other thermal target. Rather, conductor 202 may be sized and/or shaped in a way that yields predetermined thermal characteristics for a given environment. For example, the surface area of conductor 202 may be selected based on a radius (or one or more other dimensions) of conductor 202, in combination with a surface finish, surface geometry, and/or coating, among other examples.

Conductor 202 may be extended and retracted via extension/retraction mechanism 204. Examples of extension/retraction mechanism 204 include, but are not limited to, a linear actuator or a spool or reel. In some instances, a first mechanism is used to extend the conductor, while a second mechanism is used to retract the conductor. As another example, a conductor may not be retracted, as may be the case when the conductor remains in the lunar surface or other thermal target. In examples, the type of extension/retraction mechanism 204 is dependent on the type of conductor 202. For instance, a conducting wire may be extended/retracted using a spool or reel, while a drill bit may be extended/retracted using a linear actuator. While conductor 202 and extension/retraction mechanism 204 are illustrated separately, it will be appreciated that, in other examples, such aspects may be implemented by the same component (e.g., as a telescoping conductor).

Additionally, while extendable conductor assembly 200 is illustrated as comprising a single conductor 202 and a single extension/retraction mechanism 204, it will be appreciated that any number of such aspects may be used. For instance, extendable conductor assembly 200 may include any number of conductors and/or extension/retraction mechanisms and, similarly, a single extension/retraction mechanism 204 may extend/retract any number of conductors. As an example, extension/retraction mechanism 204 may include a spool mechanism that can selectively engage or disengage from conductor 202 (e.g., in response to a command from a thermal manager, such as thermal manager 114 in FIG. 1). As another example, extension/retraction mechanism 204 may include a rotary track mechanism that can be used to deploy any number of conductors 202. extendable conductor assembly 200 may include a variety of conductors, each having different thermal characteristics. In an example, a first conductor having a higher degree of emissivity/absorptivity may be used to transfer heat to a thermal target, while a second conductor having a lower degree of emissivity/absorptivity may be used to transfer heat from a thermal target (or vice versa).

Extendable conductor assembly 200 is illustrated as further including thermal sensor(s) 206 and force sensor(s) 208. As noted above, one or more thermal sensor(s) 206 may be disposed along conductor 202, such that heat transfer may be monitored (e.g., by controller 210 and/or thermal manager 114). Similarly, one or more thermal sensor(s) 206 may be proximal to a thermal connection between conductor 202 and a heat-managed component to/from which heat is transferred (e.g., one or more components of vehicle 100 in FIGS. 1A-1B). Force sensor(s) 208 may be used to identify, mitigate, or otherwise avoid instances where conductor 202 contacts a thermal target. Any of a variety of additional or alternative sensors may be used in other examples. For instance, a visible light and/or IR camera may be used to avoid contact between conductor 202 and a thermal target and/or to monitor heat transfer via conductor 202, among other examples. Additional examples of such aspects are described below with respect to method 400 of FIG. 4.

Turning now to FIG. 2B, extendable conductor assembly 250 is illustrated. Aspects of extendable conductor assembly 250 are similar to those discussed above with respect to extendable conductor assembly 120 and 200 in FIGS. 1A-B and 2A, respectively, and are therefore not necessarily redescribed below in detail. For instance, extendable conductor assembly 250 may include thermal sensor(s) 206 and force sensor(s) 208. As illustrated, extendable conductor assembly 250 includes conductor 252, linear actuator 254A, and electric motor 254B. Aspects of linear actuator 254A and electric motor 254B may be similar to extension/retraction mechanism 204 discussed above.

As illustrated, conductor 252 is a drill bit, which may include fluting (and/or any of a variety of surface preparations and/or coatings), an inner portion having one or more different thermal characteristics than an outer portion (e.g., for improved heat transfer), and/or a channel via which stabilizing compound may be introduced, among other examples. Conductor 252 may be extended/retracted via linear actuator 254A, while electric motor 254B may cause conductor 252 to rotate, thereby forming a borehole in a thermal target when conductor 252 comes in contact with the thermal target as a result of being extended via linear actuator 254A. In examples, linear actuator 254A and electric motor 254B are powered by a power system (e.g., power system 106 in FIG. 1B) and/or controlled by a controller (e.g., controller 210 in FIG. 2A or thermal manager 114 of vehicle controller 102 in FIG. 1B) according to aspects described herein.

With reference to FIG. 2C, extendable conductor assembly 260 is illustrated. Conductor 262 (aspects of which may be similar to conductors 122, 202, and/or 252) is disposed within cylindrical member 264 and is extended/retracted along linear sections 270 and 272 via carriage 268. Actuation of motors 274 and 276 thus causes linear movement of conductor 262 along linear sections 270 and 272 (via the illustrated belts and pulleys). Accordingly, carriage 268, linear sections 270 and 272, and motors 274 and 276 may together form an extension/retraction mechanism as described herein. Extendable conductor assembly 260 is further illustrated as comprising motor assembly 266, which, when actuated, causes rotation of conductor 262, such that conductor 262 can be used to form a borehole in a thermal target (e.g., similar to electric motor 254B discussed above with respect to FIG. 2B).

Figure 3:
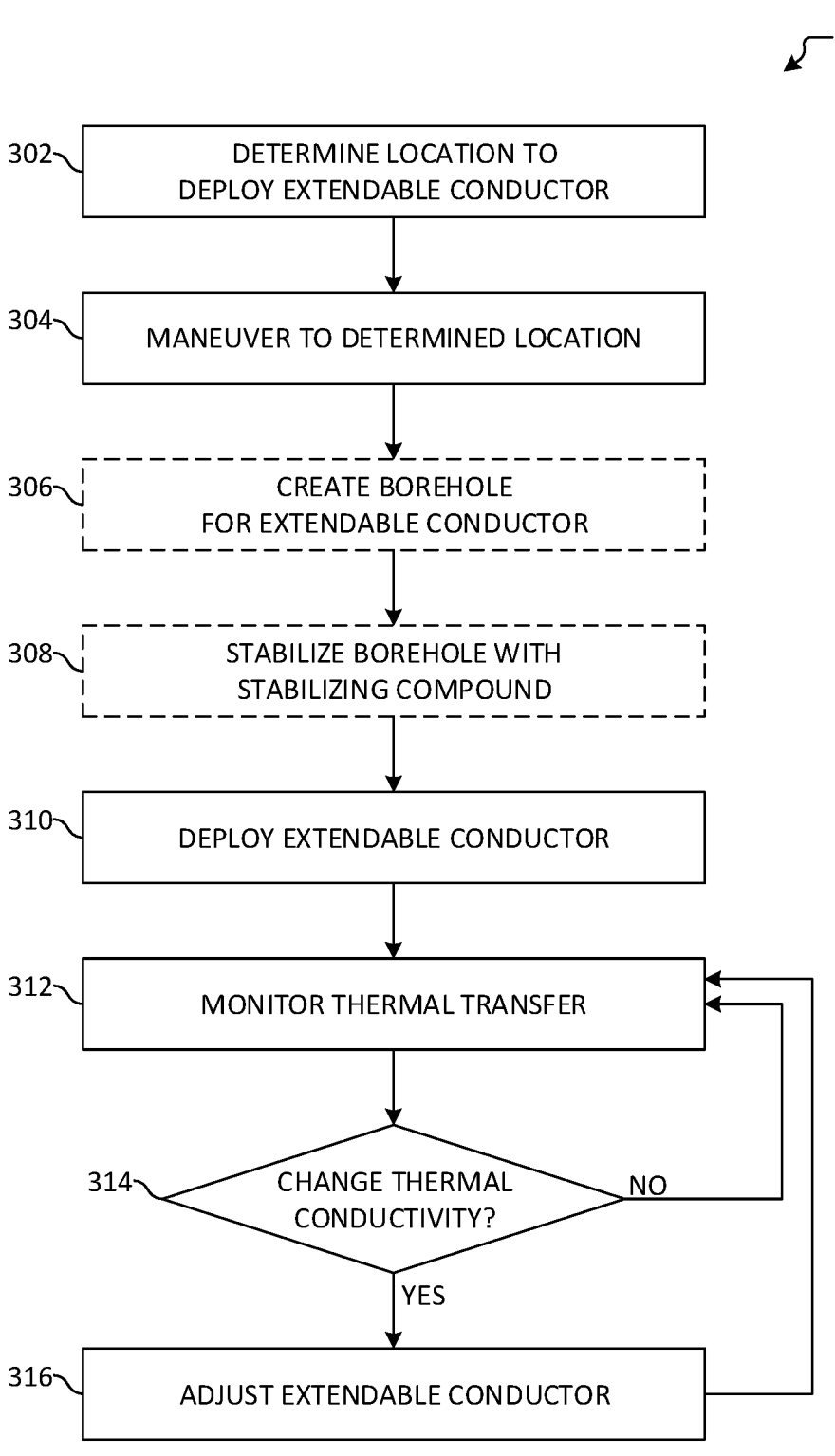
FIG. 3 illustrates an overview of an example method for thermal management using an extendable conductor according to aspects described herein.

FIG. 3 illustrates an overview of an example method 300 for thermal management using an extendable conductor according to aspects described herein. In examples, aspects of method 300 may be performed by a controller, such as vehicle controller 102 in FIG. 1B or controller 210 in FIG. 2A.

Method 300 begins at operation 302, where a location is determined at which to deploy an extendable conductor. In examples, the location may be determined based on information about an environment in which the extendable conductor is to be deployed, as may be obtained using one or more sensors (e.g., sensors 110 in FIG. 1B) and/or from one or more remote devices (e.g., via a communication system, such as communication system 108). For instance, one or more thermal sensors, visible and/or IR cameras, and/or LIDAR sensors may be used to obtain information about the environment, which may be processed to identify one or more candidate thermal targets.

The candidate thermal targets may be identified and/or ranked based on one or more criteria, such as whether the thermal target would act as a heat sink or a heat source, an expected rate of heat transfer, whether the thermal target can be used as-is (e.g., or whether a borehole would be created and/or stabilizing compound would be used), and/or the ease with which the thermal target could be prepared (e.g., based on an estimated hardness for drilling and/or an estimated amount of stabilizing compound to be used). Thus, it will be appreciated that any of a variety of additional or alternative criteria may be used in other examples. In another example, an indication of the thermal target is received from a remote device, as may be the case when similar processing is performed by the remote device.

Flow progresses to operation 304, where the extendable conductor assembly (e.g., assembly 200, 250, or 260 in FIGS. 2A, 2B, and 2C, respectively) is maneuvered to be proximate to the determined location. In examples, operation 304 comprises at least semi-autonomous operation of a vehicle (e.g., vehicle 100 in FIGS. 1A-1B) that supports the extendable conductor assembly, as may be performed by a movement controller (e.g., movement controller 116). For example, a human operator may manually maneuver the vehicle to be proximate to the location, at which point the vehicle may autonomously perform precise alignment, or vice versa. In another example, operations 302 and 304 may instead comprise receiving manual commands from a remote device, which may be used to control operation of the vehicle accordingly (thereby providing remote control of the vehicle). Thus, it will be appreciated that any of a variety of techniques may be used to maneuver the extendable conductor assembly to a thermal target for thermal management according to aspects described herein.

At operations 306 and 308, a borehole may be formed in the thermal target and the borehole may be stabilized using stabilizing compound, respectively. Operations 306 and 308 are illustrated using dashed lines to indicate that, in some examples, one or both operations may be omitted. For instance, an existing borehole may be stabilized (e.g., thus omitting operation 306 and performing operation 308) or a new borehole may not need to be stabilized (e.g., thus performing operation 306 and omitting operation 308).

Operation 306 may comprise operating a drill to form the borehole, which may be the extendable conductor itself (e.g., conductor 252 or conductor 262 in FIG. 2B or 2C, respectively) or may be separate from the extendable conductor. Similarly, operation 308 may comprise introducing stabilizing compound via the extendable conductor itself or separate hardware may be used, among other examples.

Flow progresses to operation 310, where the extendable conductor is deployed. For example, the extendable conductor (e.g., conductor 122, 202, 252, or 262 in FIGS. 1A, 2A, 2B, and 2C, respectively) may be deployed via an extension/retraction mechanism (e.g., extension/retraction mechanism 204), such as a linear actuator (linear actuator 254A) or a spool/reel, among other examples. As noted above, a telescoping conductor may be used in some examples. In examples, one or more force sensors (e.g., force sensor(s) 208) may be monitored when deploying the extendable conductor, such that contact between the extendable conductor and the thermal target may be identified and handled according to aspects described herein. Additional examples of such aspects are discussed below with respect to method 400 of FIG. 4.

At operation 312, heat transfer is monitored. As noted above, the extendable conductor may include one or more thermal sensors (e.g., thermal sensor(s) 206 in FIG. 2A) that may be used to identify temperature differences along the extendable conductor and, thus, the rate at which heat is being transferred. In examples, the extendable conductor includes at least an innermost and an outermost thermal sensor, where the outermost thermal sensor is proximal to the thermal target and the innermost thermal sensor is proximal to a thermal connection between the extendable conductor and a heat-managed component (e.g., of vehicle 100). It will be appreciated that any of a variety of additional or alternative techniques may be used to monitor the heat transfer, including, but not limited to, an IR camera and/or one or more thermal sensors at the heat-managed component itself. For instance, a camera may be positioned so as to observe at least a part of the conductor and/or thermal target.

That is, the heat transfer may be monitored based at least in part on the degree to which one or more heat-managed components are affected by heat transferred via the extendable conductor.

Flow progresses to determination 314, where it is determined whether to change the thermal conductivity (e.g., thereby increasing or decreasing the rate of heat transfer). As an example, determination 314 may be based at least in part on an expected or target rate of heat transfer and/or a target temperature for a heat-managed component. Accordingly, if it is determined that the actual rate of heat transfer is less than or greater than the target rate of heat transfer, it may be determined to increase or decrease, respectively, the rate of heat transfer. Similarly, if the target temperature of the heat-managed component has been reached, it may be determined to retract the extendable conductor, thereby ending heat transfer between the thermal target and the heat-managed component. In examples, a rate of heat transfer may be modeled, as there may be a propagation delay between heat that is radiated or absorbed by the extendable conductor and the thermal effect on an associated heat-managed component. Thus, it may be determined to adjust the extendable conductor even before a target temperature or other target state of the heat-managed component has been reached.

Thus, if it is determined to change the thermal conductivity, flow branches "YES" to operation 316, where the extendable conductor is adjusted (e.g., extended or retracted) accordingly. Flow then returns to operation 312, thereby forming a feedback loop through which heat transfer between the thermal target and one or more heat-managed components (e.g., of vehicle 100) may be managed. By contrast, if it is determined not to change the thermal conductivity, flow instead branches "NO" and returns to operation 312. Method 300 may eventually terminate at operation 316, at which the extendable conductor may be retracted (e.g., such that a different thermal target may be identified or the same thermal target may be used at a later point in time).

Figure 4:
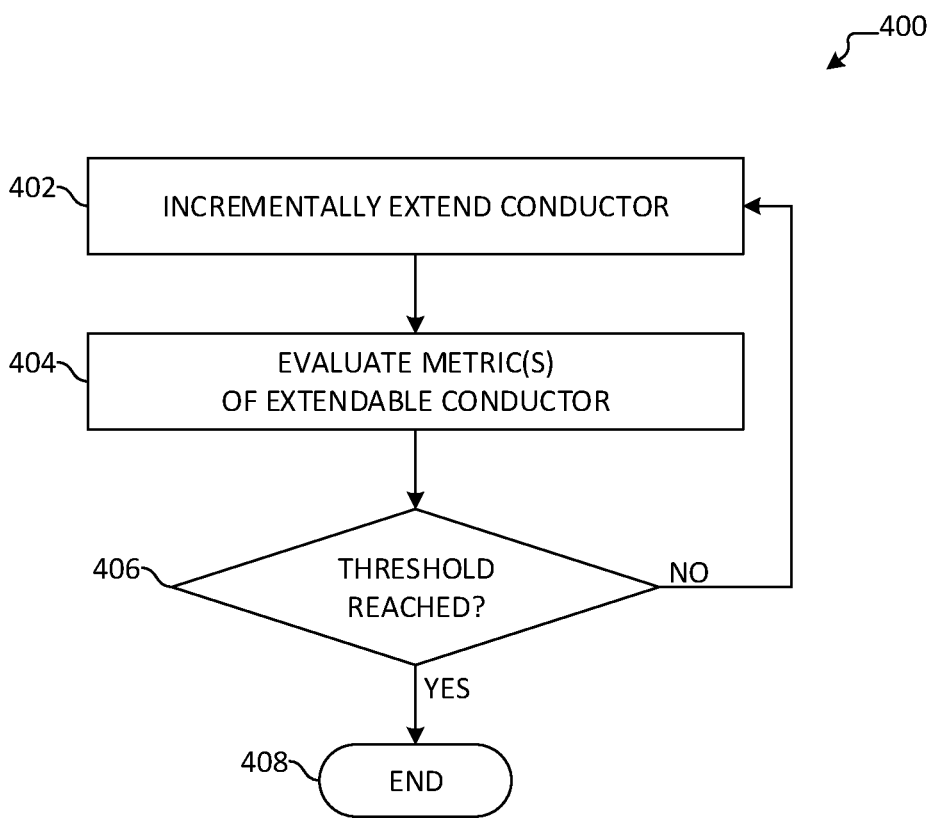
FIG. 4 illustrates an overview of an example method for deploying an extendable conductor according to aspects described herein.

FIG. 4 illustrates an overview of an example method 400 for deploying an extendable conductor according to aspects described herein. In examples, aspects of method 300 may be performed by a controller, such as vehicle controller 102 in FIG. 1B or controller 210 in FIG. 2A. In some examples, aspects of method 400 are performed as part of operation 310 discussed above with respect to method 300 in FIG. 3.

Method 400 begins at operation 402, where the conductor is extended. For example, the extendable conductor (e.g., conductor 122, 202, 252, or 262 in FIGS. 1A, 2A, 2B, and 2C, respectively) may be deployed via an extension/retraction mechanism (e.g., extension/retraction mechanism 204), such as a linear actuator (linear actuator 254A) or a spool/reel, among other examples. As noted above, a telescoping conductor may be used in some examples. Operation 402 may comprise providing a signal to one or more electric motors associated with the extension/retraction mechanism, thereby causing extension of the conductor accordingly.

At operation 404, one or more metrics associated with the extendable conductor are evaluated. For example, the extendable conductor assembly may include one or more force sensors (e.g., force sensor(s) 208 in FIG. 2A). The force sensors may provide an indication as to whether the extendable conductor has come into contact with a thermal target or other object. It will be appreciated that, in other examples, any of a variety of additional or alternative sensors may be used, including, but not limited to, a visible and/or IR camera, a proximity sensor, a limit switch, a rotary encoder (e.g., of a spool/reel), and/or a capacitance sensor, among other examples. Operation 404 may comprise evaluating data obtained from such sensors in relation to a threshold and/or a set of rules, among other examples.

At determination 406, it is determined whether a threshold is reached and/or whether one or more rules are satisfied, depending on the metrics that were evaluated at operation 404. If it is determined that a threshold has not yet been met and/or a set of rules has not yet been satisfied, flow branches "NO" and returns to operation 402, where the extendable conductor may continue to be deployed. Thus, operations 402-406 form a feedback loop via which the extendable conductor may be deployed until an obstacle is encountered or the conductor is fully deployed.

By contrast, if it is determined that the threshold is reached and/or the set of rules is satisfied, flow instead branches "YES" and terminates at operation 408. In examples, one or more operations may be performed when flow branches "YES," as may be the case in instances where an obstacle is detected and/or when the extendable conductor was not fully deployed. For example, the extendable conductor may be at least partially retracted and/or an indication may be provided for manual control.

Figure 5:
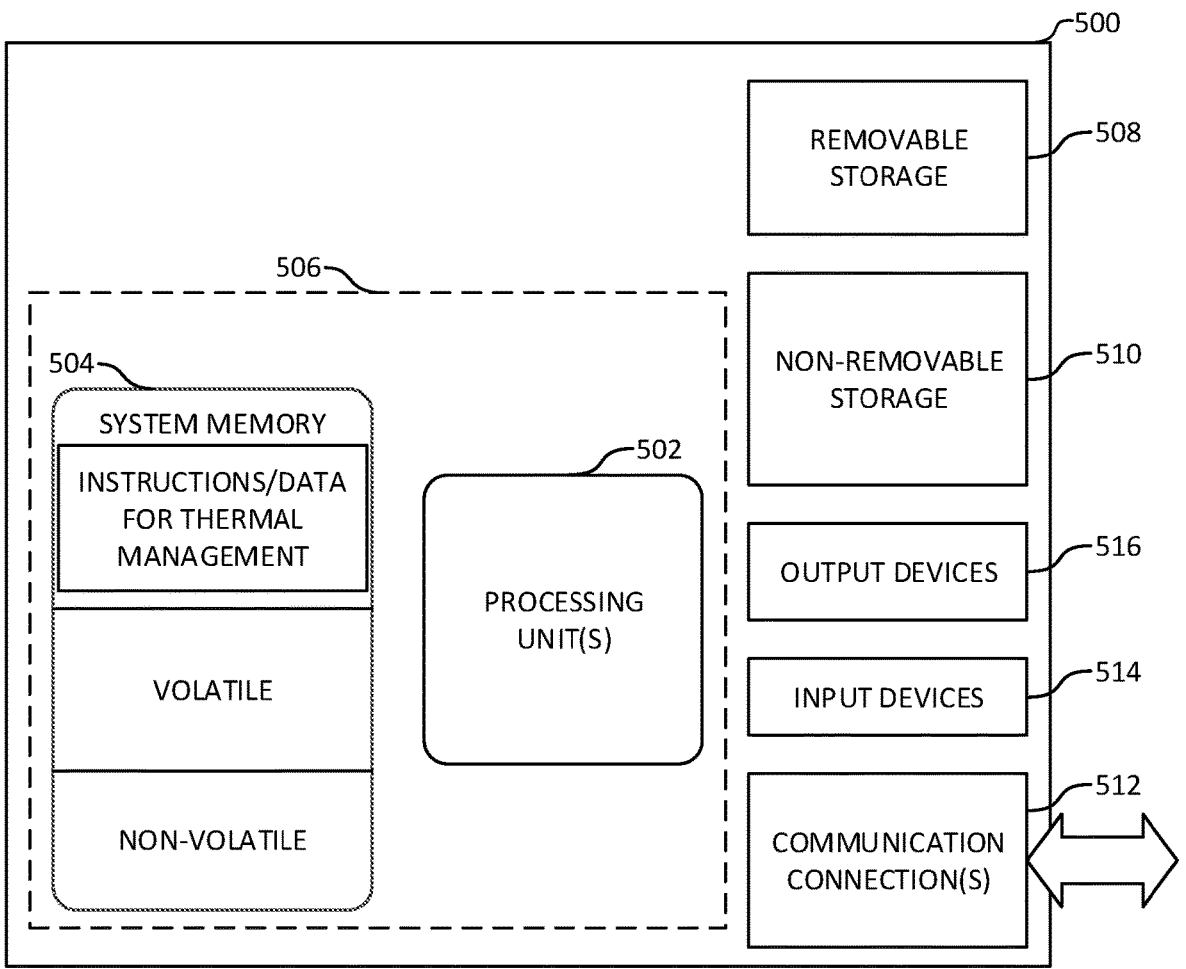
FIG. 5 illustrates an example of a suitable computing environment in which one or more aspects of the present application may be implemented.

FIG. 5 illustrates an example of a suitable computing environment 500 in which one or more of the present embodiments may be implemented. For example, aspects of computing environment 500 may be used by a controller, such as vehicle controller 102 in FIG. 1B or controller 210 in FIG. 2A. This is only one example of a suitable computing environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, computing environment 500 typically may include at least one processing unit 502 and memory 504. Depending on the exact configuration and type of computing device, memory 504 (storing, among other things, APIs, programs, etc. and/or other components or instructions to implement or perform the system and methods disclosed herein, etc.) may be volatile (such as RAM), non-volatile (such as ROM, flash memory, etc.), or some combination of the two. This most basic configuration is illustrated in FIG. 5 by dashed line 506. Further, environment 500 may also include storage devices (removable, 508, and/or non-removable, 510) including, but not limited to, magnetic or optical disks or tape. Similarly, environment 500 may also have input device(s) 514 such as a keyboard, mouse, pen, voice input, etc. and/or output device(s) 516 such as a display, speakers, printer, etc. Also included in the environment may be one or more communication connections, 512, such as LAN, WAN, point to point, etc.

Computing environment 500 may include at least some form of computer readable media. The computer readable media may be any available media that can be accessed by processing unit 502 or other devices comprising the computing environment. For example, the computer readable media may include computer storage media and communication media. The computer storage media may include volatile and nonvolatile, removable and non-removable media implemented in any method or technology for storage of information such as computer readable instructions, data structures, program modules or other data. The computer storage media may include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium, which can be used to store the desired information. The computer storage media may not include communication media.

The communication media may embody computer readable instructions, data structures, program modules, or other data in a modulated data signal such as a carrier wave or other transport mechanism and includes any information delivery media. The term "modulated data signal" may mean a signal that has one or more of its characteristics set or changed in such a manner as to encode information in the signal. For example, the communication media may include a wired media such as a wired network or direct-wired connection, and wireless media such as acoustic, RF, infrared and other wireless media. Combinations of the any of the above should also be included within the scope of computer readable media.

The computing environment 500 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets, and the Internet.

The different aspects described herein may be employed using software, hardware, or a combination of software and hardware to implement and perform the systems and methods disclosed herein. Although specific devices have been recited throughout the disclosure as performing specific functions, one skilled in the art will appreciate that these devices are provided for illustrative purposes, and other devices may be employed to perform the functionality disclosed herein without departing from the scope of the disclosure.

As stated above, a number of program modules and data files may be stored in the system memory 504. While executing on the processing unit 502, program modules (e.g., applications, Input/Output (I/O) management, and other utilities) may perform processes including, but not limited to, one or more of the stages of the operational methods described herein.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the computing environment 500 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

It will be appreciated that examples of the disclosed subject matter relate to the following clauses:

1. A vehicle, comprising: a plurality of ground-engaging members; and an extendable conductor assembly supported by the plurality of ground-engaging members, the extendable conductor assembly comprising: an extendable conductor thermally coupled to a heat-managed component of the vehicle; and an extension mechanism configured to extend the extendable conductor in relation to a thermal target, thereby thermally coupling the heat-managed component and the thermal target when the extendable conductor is extended.

2. The vehicle of clause 1, wherein: the extendable conductor further comprises a first thermal sensor and a second thermal sensor; the first thermal sensor is configured to be closer to the thermal target than the second thermal sensor; and the second thermal sensor is configured to be closer to the heat-managed component than the first thermal sensor.

3. The vehicle of any one of clauses 1-2, wherein the extendable conductor assembly further comprises a force sensor configured to detect a force associated with the extendable conductor when actuated by the extension mechanism.

4. The vehicle of any one of clauses 1-3, wherein the extension mechanism is one of a linear actuator, a spool, or a reel.

5. The vehicle of any one of clauses 1-3, wherein the extendable conductor and the extension mechanism together form a telescoping conductor.

6. The vehicle of any one of clauses 1-5, wherein the extendable conductor is one of a rod, a wire, a heat pipe, or a drill bit.

7. The vehicle of any one of clauses 1-6, wherein: the extension mechanism further comprises an electric motor to rotate the extendable conductor; and the extendable conductor is a drill bit, comprising: an innermost portion; and an outermost portion having less thermal conductivity than the innermost portion.

8. The vehicle of any one of clauses 1-7, wherein the extension mechanism is further configured to retract the extendable conductor.

9. A method for thermal management via an extendable conductor assembly, the method comprising: determining a rate of transfer associated with a conductor of the extendable conductor assembly; evaluating the rate of transfer to determine whether to extend or retract the conductor; and based on determining to retract the conductor, controlling an extension/retraction mechanism of the extendable conductor assembly to retract the conductor.

10. The method of clause 9, wherein the rate of transfer is determined based at least in part on a first thermal sensor and a second thermal sensor of the extendable conductor assembly.

11. The method of any one of clauses 9-10, wherein the rate of transfer is determined based at least in part on a thermal sensor associated with a heat-managed component thermally coupled to the conductor.

12. The method of any one of clauses 9-11, wherein it is determined to partially retract the conductor based on determining the rate of transfer exceeds a predetermined threshold.

13. The method of any one of clauses 9-12, wherein it is determined to fully retract the extendable conductor based on determining that a forecasted temperature of a heat-managed component thermally coupled to the conductor will reach a predetermined threshold based on the determined rate of transfer.

14. An extendable conductor assembly, comprising: a conductor configured to be thermally coupled to a heat-managed component; an extension/retraction mechanism configured to selectively extend or retract the conductor in relation to a thermal target, thereby thermally coupling the heat-managed component and the thermal target when the conductor is extended; and a controller electrically coupled to the extension/retraction mechanism, comprising: a processor; and a memory storing instructions that, when executed by the processor, cause the controller to perform a set of operations, comprising: evaluating a thermal rate of transfer associated with the conductor; based on determining to increase the thermal rate of transfer, controlling the extension/retraction mechanism to extend the conductor; and based on determining to decrease the thermal rate of transfer, controlling the extension/retraction mechanism to retract the conductor.

15. The extendable conductor assembly of clause 14, further comprising a force sensor to enable the controller to detect a force associated with actuating the conductor.

16. The extendable conductor assembly of any one of clauses 14-15, wherein: the conductor further comprises a first thermal sensor and a second thermal sensor; the first thermal sensor is configured to be closer to the thermal target than the second thermal sensor; the second thermal sensor is configured to be closer to the heat-managed component than the first thermal sensor; and evaluating the thermal rate of transfer comprises evaluating temperature data from the first thermal sensor and the second thermal sensor.

17. The extendable conductor assembly of any one of clauses 14-16, wherein the thermal rate of transfer is evaluated based at least in part on a thermal sensor associated with the heat-managed component.

18. The extendable conductor assembly of any one of clauses 14-17, wherein: it is determined to increase the thermal rate of transfer when the thermal rate of transfer is below a predetermined threshold; and it is determined to decrease the thermal rate of transfer when the thermal rate of transfer is above a predetermined threshold.

19. The extendable conductor assembly of any one of clauses 14-18, wherein it is determined to fully retract the conductor based on determining that a forecasted temperature of the heat-managed component will reach a predetermined threshold based on the thermal rate of transfer.

20. The extendable conductor assembly of any one of clauses 14-19, wherein the thermal rate of transfer is determined based at least in part on a camera configured to view at least a part of the conductor.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A vehicle, comprising:
a plurality of ground-engaging members; and
an extendable conductor assembly supported by the plurality of ground-engaging members, the extendable conductor assembly comprising:
an extendable conductor thermally coupled to a heat-managed component of the vehicle;
an extension/retraction mechanism configured to selectively extend or retract a length of the extendable conductor from a housing in relation to a thermal target that is external to the housing to control a rate of radiative heat transfer between the extendable conductor and the thermal target proportional to surface area of the length of the extendable conductor that is exposed to the thermal target, thereby thermally coupling the heat-managed component and the thermal target proportional to the length of the extendable conductor that is exposed to the thermal management target by the extension/retraction mechanism; and
a controller electrically coupled to the extension/retraction mechanism, comprising:
a processor; and
a memory storing instructions that, when executed by the processor, cause the controller to perform a set of operations, comprising:
evaluating a thermal rate of transfer associated with the extendable conductor;
based on determining to increase the thermal rate of transfer, controlling the extension/retraction mechanism to extend the extendable conductor, thereby increasing the surface area of the conductor that is exposed to the thermal target; and
based on determining to decrease the thermal rate of transfer, controlling the extension/retraction mechanism to retract the extendable conductor, thereby decreasing the surface area of the conductor that is exposed to the thermal target.

2. The vehicle of claim 1, wherein:

the extendable conductor further comprises a first thermal sensor and a second thermal sensor;

the first thermal sensor is configured to be closer to the thermal target than the second thermal sensor; and the second thermal sensor is configured to be closer to the heat-managed component than the first thermal sensor.

3. The vehicle of claim 1, wherein the extendable conductor assembly further comprises a force sensor configured to detect a force associated with the extendable conductor when actuated by the extension mechanism.

4. The vehicle of claim 1, wherein the extension/retraction mechanism is one of a linear actuator, a spool, or a reel.

5. The vehicle of claim 1, wherein the extendable conductor and the extension/retraction mechanism together form a telescoping conductor.

6. The vehicle of claim 1, wherein the extendable conductor is one of a rod, a wire, a heat pipe, or a drill bit.

7. The vehicle of claim 1, wherein:

the extension/retraction mechanism further comprises an electric motor to rotate the extendable conductor; and the extendable conductor is a drill bit, comprising:

an innermost portion; and an outermost portion having less thermal conductivity than the innermost portion.

8. An extendable conductor assembly, comprising:

a conductor configured to be thermally coupled to a heat-managed component;

an extension/retraction mechanism configured to selectively extend or retract a length of the conductor from a housing in relation to a thermal target that is external to the housing to control a rate of radiative heat transfer between the conductor and the thermal target proportional to surface area of the length of the conductor that is exposed to the thermal target, thereby thermally coupling the heat-managed component and the thermal target proportional to the length of the conductor that is exposed to the thermal target by the extension/retraction mechanism; and a controller electrically coupled to the extension/retraction mechanism, comprising:

a processor; and a memory storing instructions that, when executed by the processor, cause the controller to perform a set of operations, comprising:

evaluating a thermal rate of transfer associated with the conductor;

based on determining to increase the thermal rate of transfer, controlling the extension/retraction mechanism to extend the conductor, thereby increasing the surface area of the conductor that is exposed to the thermal target; and based on determining to decrease the thermal rate of transfer, controlling the extension/retraction mechanism to retract the conductor, thereby decreasing the surface area of the conductor that is exposed to the thermal target.

9. The extendable conductor assembly of claim 8, further comprising a force sensor to enable the controller to detect a force associated with actuating the conductor.

10. The extendable conductor assembly of claim 8, wherein:

the conductor further comprises a first thermal sensor and a second thermal sensor;

the first thermal sensor is configured to be closer to the thermal target than the second thermal sensor;

the second thermal sensor is configured to be closer to the heat-managed component than the first thermal sensor; and evaluating the thermal rate of transfer comprises evaluating temperature data from the first thermal sensor and the second thermal sensor.

11. The extendable conductor assembly of claim 8, wherein the thermal rate of transfer is evaluated based at least in part on a thermal sensor associated with the heat-managed component.

12. The extendable conductor assembly of claim 8, wherein:

the controller determines to increase the thermal rate of transfer when the thermal rate of transfer is below a predetermined threshold; and the controller determines to decrease the thermal rate of transfer when the thermal rate of transfer is above a predetermined threshold.

13. The extendable conductor assembly of claim 8, wherein the controller determines to fully retract the conductor based on determining that a forecasted temperature of the heat-managed component will reach a predetermined threshold based on the thermal rate of transfer.

14. The extendable conductor assembly of claim 8, wherein the thermal rate of transfer is determined based at least in part on a camera configured to view at least a part of the conductor.

15. The extendable conductor assembly of claim 8, wherein the conductor comprises a rod, a wire, a heat pipe, or a drill bit.

16. The extendable conductor assembly of claim 8, wherein:

the extension/retraction mechanism further comprises an electric motor to rotate the conductor; and the conductor is a drill bit, comprising:

an innermost portion; and an outermost portion having less thermal conductivity than the innermost portion.

17. The extendable conductor assembly of claim 8, wherein the extension/retraction mechanism is one of a linear actuator, a spool, or a reel.

18. The extendable conductor assembly of claim 8, wherein the extendable conductor and the extension/retraction mechanism together form a telescoping conductor.

19. The vehicle of claim 1, wherein:

the controller determines to increase the thermal rate of transfer when the thermal rate of transfer is below a predetermined threshold; and the controller determines to decrease the thermal rate of transfer when the thermal rate of transfer is above a predetermined threshold.

20. The vehicle of claim 1, wherein the controller determines to fully retract the conductor based on determining that a forecasted temperature of the heat-managed component will reach a predetermined threshold based on the thermal rate of transfer.

* * * * *